United States Patent
Ichien et al.

(10) Patent No.: US 11,960,277 B2
(45) Date of Patent: Apr. 16, 2024

(54) UNMANNED VEHICLE CONTROLLING SYSTEM AND METHOD, AND NONTRANSITORY COMPUTER-READABLE MEDIUM

(71) Applicant: NEC Corporation, Tokyo (JP)

(72) Inventors: Masumi Ichien, Tokyo (JP); Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 203 days.

(21) Appl. No.: 17/437,950

(22) PCT Filed: Mar. 20, 2019

(86) PCT No.: PCT/JP2019/011893
§ 371 (c)(1),
(2) Date: Sep. 10, 2021

(87) PCT Pub. No.: WO2020/188818
PCT Pub. Date: Sep. 24, 2020

(65) Prior Publication Data
US 2022/0171383 A1 Jun. 2, 2022

(51) Int. Cl.
*G05D 1/00* (2006.01)
*G06F 3/04847* (2022.01)
*H04W 4/46* (2018.01)

(52) U.S. Cl.
CPC ......... *G05D 1/0016* (2013.01); *G05D 1/0027* (2013.01); *G06F 3/04847* (2013.01); *H04W 4/46* (2018.02)

(58) Field of Classification Search
CPC ..... G05D 1/0016; G05D 1/0027; H04W 4/46; G06F 3/04847
See application file for complete search history.

(56) References Cited

U.S. PATENT DOCUMENTS

2006/0265103 A1* 11/2006 Orita ............... G05D 1/0251
700/245
2007/0061116 A1  3/2007 Bush
(Continued)

FOREIGN PATENT DOCUMENTS

| JP | 2787061 B2 | 8/1998 |
| JP | 3465725 B2 | 11/2003 |

(Continued)

OTHER PUBLICATIONS

Extended European Search Report for EP Application No. EP19919956.3 dated on Feb. 11, 2022.
(Continued)

*Primary Examiner* — Aaron L Troost

(57) ABSTRACT

To make it possible to change the action of an unmanned vehicle by reflecting the importance of purposes that can change in response to a change in the situation. An unmanned vehicle (11) acts according to a plurality of purposes. A purpose importance input means (12) inputs the importance of each purpose in the unmanned vehicle (11). An action parameter determining means (13) determines a parameter for controlling the action of the unmanned vehicle (11) based on purpose importance information indicating the input importance of each purpose. An action controlling means (14) controls the action of the unmanned vehicle (11) in accordance with the parameter determined by the action parameter determining means (13).

14 Claims, 13 Drawing Sheets

(56) References Cited

U.S. PATENT DOCUMENTS

| | | | |
|---|---|---|---|
| 2013/0206899 A1 | 8/2013 | Sahasrabudhe et al. | |
| 2016/0363454 A1 | 12/2016 | Hatanaka et al. | |
| 2018/0043532 A1* | 2/2018 | Lection | B25J 9/1661 |
| 2019/0354113 A1 | 11/2019 | Ogawa et al. | |
| 2020/0027346 A1* | 1/2020 | Lisewski | H04W 4/40 |

FOREIGN PATENT DOCUMENTS

| | | |
|---|---|---|
| JP | 2017-004373 A | 1/2017 |
| WO | 2010/076787 A2 | 7/2010 |
| WO | 2018/105599 A1 | 6/2018 |
| WO | 2018/198313 A1 | 11/2018 |

OTHER PUBLICATIONS

International Search Report for PCT Application No. PCT/JP2019/011893, dated Jun. 18, 2019.

* cited by examiner

UNMANNED VEHICLE CONTROLLING SYSTEM AND METHOD, AND NONTRANSITORY COMPUTER-READABLE MEDIUM

This application is a National Stage Entry of PCT/JP2019/011893 filed on Mar. 20, 2019, the contents of all of which are incorporated herein by reference, in their entirety.

TECHNICAL FIELD

The present disclosure relates to unmanned vehicle controlling systems and methods, unmanned vehicles, directing terminals, and computer-readable media.

BACKGROUND ART

There is a trend of utilizing unmanned vehicles equipped with information acquiring devices, such as sensors and cameras, to execute efficient and safe operations within a specific area by controlling the actions of the unmanned vehicles. In one conceivable application, for example, unmanned vehicles are dispatched to an area, within a disaster-stricken area, where the situation is unknown, and the situation in that area is grasped with the unmanned vehicles safely and efficiently.

Some methods have been proposed with respect to controlling unmanned vehicles. For example, Patent Literature 1 discloses a flight control display system that controls the flight of a remotely operated unmanned helicopter. The flight control display system described in Patent Literature 1 includes a display and a remote operation device. The display displays data concerning the flight centrally on one screen, and the remote operation device receives input of data from an operator.

As another related art, Patent Literature 2 discloses a mobile robot controlling device. According to Patent Literature 2, a plurality of mobile robots, when moving based on the same destination, exchange parameters related to their movement among nearby mobile robots. One mobile robot selects a parameter to serve as a new parameter from a plurality of received parameters and chooses either of the selected parameter and the current parameter based on the probability. This mobile robot changes a part of the selected parameter to obtain a new parameter and determines its moving direction based on the new parameter.

CITATION LIST

Patent Literature

Patent Literature 1: Japanese Patent No. 2787061
Patent Literature 2: Japanese Patent No. 3465725
Patent Literature 3: International Patent Publication No. WO2018/105599

SUMMARY OF INVENTION

Technical Problem

In many cases, there are multiple conceivable purposes for which unmanned vehicles are put into action. In the example of applying an unmanned vehicle to monitoring of the situation in an area, an initial purpose is to create a map of that area. Other conceivable purposes for which the unmanned vehicle is put into action after the map is created may include to circulate the area periodically for monitoring or to work to perform a certain action within the area. Moreover, in a case where the communication is limited, an unmanned vehicle may serve the purpose of uploading data to a base station periodically or forming a wireless communication bridge to another unmanned vehicle.

In the method described in Patent Literature 1, the purpose is to obtain information appropriate for an operator of an unmanned vehicle to operate the unmanned vehicle. With the method described in Patent Literature 1, when moving an unmanned vehicle according to a certain purpose, its operator needs to pay attention to things, such as avoiding collision or stabilizing the posture, that are unrelated to the purpose, for example. Therefore, the method places a heavy load on the operator, and this limits the number of unmanned vehicles that one person can handle.

Meanwhile, according to Patent Literature 2, the plurality of mobile robots, when moving based on the same destination, exchange the parameters related to their movement among the nearby mobile robots and determine their new parameters. This configuration allows the mobile robots to move efficiently with respect to one fixed destination while exchanging information among the nearby mobile robots. However, although the technique according to Patent Literature 2 can prevent a deadlock near the destination, this technique does not allow the unmanned vehicles to be controlled so as to suit a plurality of purposes.

Patent Literature 3 discloses a control device that controls the actions of unmanned vehicles constituting a group of unmanned vehicles. In the group of unmanned vehicles, each unmanned vehicle acts autonomously according to a plurality of purposes (actions) shared among the entire group of unmanned vehicles. One unmanned vehicle acquires information concerning the status of the other unmanned vehicles. This unmanned vehicle calculates comparison values with respect to a plurality of types of actions (purposes) that the unmanned vehicle should take based on the information concerning its own status and the information concerning the status of the other unmanned vehicles. The unmanned vehicle then selects an action that it should take based on the comparison values with respect to the plurality of types of actions. This method allows an unmanned vehicle to determine, among a plurality of purposes shared by a plurality of unmanned vehicles, the purpose that this unmanned vehicle should serve according to the status of its nearby unmanned vehicles.

However, the control device described in Patent Literature 3 includes no means for dynamically changing the importance of each purpose. Therefore, when the unmanned vehicles are to act according to a plurality of purposes, the control device can neither change the importance of each purpose in response to a change in the situation nor reflect such a change onto the autonomous action of each unmanned vehicle. Accordingly, the control device described in Patent Literature 3 is not capable of making each unmanned vehicle change its action flexibly in response to a change in the situation.

In view of the above issues, an object of the present disclosure is to provide an unmanned vehicle controlling system and method, an unmanned vehicle, a directing terminal, and a computer-readable medium that are capable of making an unmanned vehicle change its action flexibly in response to a change in the situation.

Solution to Problem

In order to achieve the above object, the present disclosure provides, as a first aspect, an unmanned vehicle controlling system that includes an unmanned vehicle configured to act according to a plurality of purposes, purpose importance input means configured to input importance of the purposes in the unmanned vehicle, action parameter determining means configured to determine a parameter for controlling an action of the unmanned vehicle based on purpose importance information indicating the input importance of the purposes, and action controlling means configured to control the action of the unmanned vehicle based on the parameter.

As a second aspect, the present disclosure provides an unmanned vehicle that includes action parameter determining means configured to determine a parameter for controlling an action of the unmanned vehicle based on purpose importance information indicating importance of a plurality of purposes in the unmanned vehicle that acts according to the plurality of purposes, and action controlling means configured to control the action of the unmanned vehicle based on the parameter.

As a third aspect, the present disclosure provides a directing terminal that includes communication means configured to communicate with an unmanned vehicle that acts according to a plurality of purposes, and purpose importance input means configured to input importance of the purposes in the unmanned vehicle.

As a fourth aspect, the present disclosure discloses an unmanned vehicle controlling method that includes determining a parameter for controlling an action of an unmanned vehicle based on purpose importance information indicating importance of a plurality of purposes in the unmanned vehicle that acts according to the plurality of purposes, and controlling the action of the unmanned vehicle based on the parameter.

As a fifth aspect, the present disclosure provides an unmanned vehicle controlling method that includes determining importance of a plurality of purposes in an unmanned vehicle that acts according to the plurality of purposes, and transmitting the importance of the purposes to an unmanned vehicle configured to control an action thereof based on purpose importance information indicating the importance of the purposes.

As a sixth aspect, the present disclosure provides a computer-readable medium storing a program that causes a processor to execute a process of determining a parameter for controlling an action of an unmanned vehicle based on purpose importance information indicating importance of a plurality of purposes in the unmanned vehicle that acts according to the plurality of purposes, and controlling the action of the unmanned vehicle based on the parameter.

As a seventh aspect, the present disclosure provides a computer-readable medium storing a program that causes a processor to execute a process of determining importance of a plurality of purposes in an unmanned vehicle that acts according to the plurality of purposes, and transmitting the importance of the purposes to an unmanned vehicle configured to control an action thereof based on purpose importance information indicating the importance of the purposes.

ADVANTAGEOUS EFFECTS OF INVENTION

The unmanned vehicle controlling system and method, the unmanned vehicle, the directing terminal, and the computer-readable medium according to the present disclosure can make an unmanned vehicle change its action flexibly in response to a change in the situation.

EXAMPLE EMBODIMENTS

Figure 1:
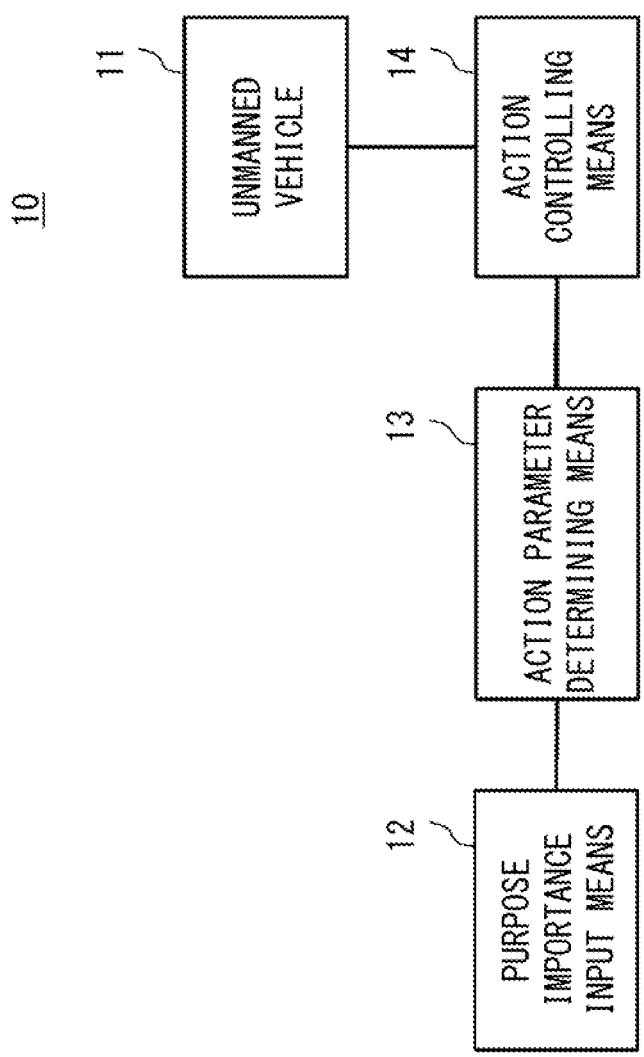
FIG. 1 is a block diagram schematically illustrating an example of an unmanned vehicle controlling system according to the present disclosure.

An overview of the present disclosure will be given prior to the description of some example embodiments of the present disclosure. FIG. 1 schematically illustrates an example of an unmanned vehicle controlling system according to the present disclosure. An unmanned vehicle controlling system 10 includes an unmanned vehicle 11, a purpose importance input means 12, an action parameter determining means 13, and an action controlling means 14.

The unmanned vehicle 11 acts according to a plurality of purposes. The purpose importance input means 12 inputs the importance of each purpose of the unmanned vehicle 11. The action parameter determining means 13 determines a parameter for controlling the action of the unmanned vehicle 11 based on purpose importance information indicating the input importance of each purpose. The action controlling means 14 controls the action of the unmanned vehicle 11 in accordance with the parameter determined by the action parameter determining means 13.

According to the present example embodiment, the action parameter determining means 13 determines, based on the purpose importance information, the parameter for controlling the action of the unmanned vehicle 11 that acts autonomously according to a plurality of purposes, for example. The action controlling means 14 controls the action of the unmanned vehicle 11 in accordance with the determined parameter. This configuration can make the unmanned vehicle 11 execute an action reflecting the importance of each purpose. For example, changing the importance of each purpose in response to a change in the situation can make the unmanned vehicle 11 change its action flexibly in response to the change in the situation.

Figure 2:
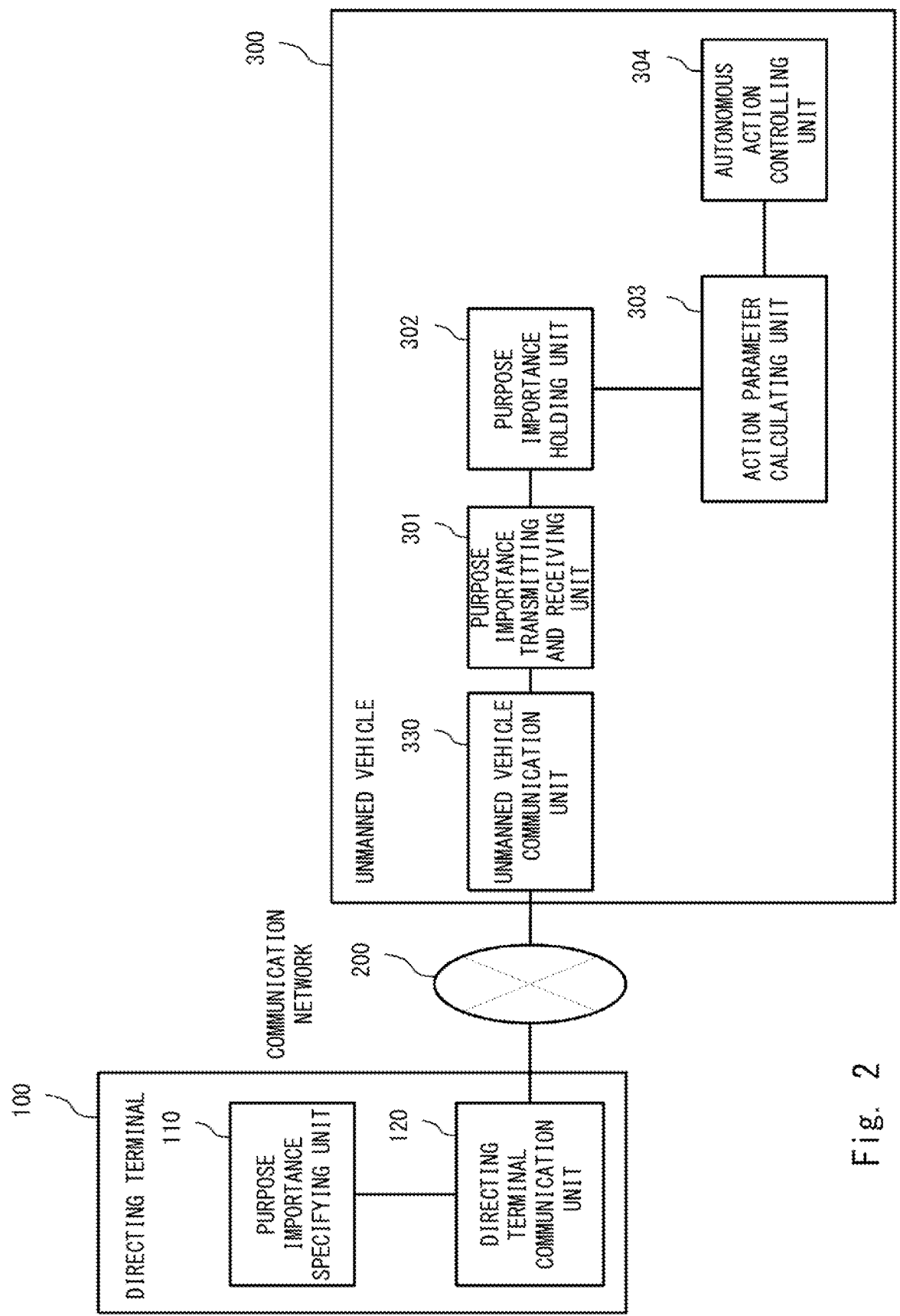
FIG. 2 is a block diagram illustrating an example of a configuration of an unmanned vehicle controlling system according to a first example embodiment of the present disclosure.

Hereinafter, some example embodiments of the present disclosure will be described in detail with reference to the drawings. FIG. 2 illustrates an unmanned vehicle controlling system according to a first example embodiment of the present disclosure. The unmanned vehicle controlling system includes a directing terminal 100 and an unmanned vehicle 300. The directing terminal 100 and the unmanned vehicle 300 are connected to and can communicate with each other via a communication network 200.

The directing terminal 100 is a terminal device for a person to give directions to the unmanned vehicle 300. The directing terminal 100 is constituted by, for example but not limited to, a non-portable device or a tablet device. The communication network 200 is a communication path for the directing terminal 100 and the unmanned vehicle 300 to exchange information therebetween. There is no particular limitation on the types of communication in the communication network 200.

The unmanned vehicle 300 acts autonomously according to a plurality of purposes. The unmanned vehicle 300 is, for example but not limited to, an unmanned vehicle or a robot that acts autonomously in the water, on land, or in the air. The unmanned vehicle 300, for example, performs sensing within a predetermined area by use of a sensing device provided in the unmanned vehicle 300 and controls itself by calculating its own position while monitoring the situation within the area as well as the communication state. The unmanned vehicle 300 corresponds to the unmanned vehicle 11 illustrated in FIG. 1.

The directing terminal 100 includes a purpose importance specifying unit 110 and a directing terminal communication unit 120. The purpose importance specifying unit 110 receives an input of the importance of a purpose for which a person wants to put the unmanned vehicle 300 into action. The directing terminal communication unit 120 is a communication unit provided in the directing terminal 100. The directing terminal communication unit 120 is a module for transmitting and receiving data via the communication network 200. The purpose importance specifying unit 110 120 transmits purpose importance information to the unmanned vehicle 300 via the directing terminal communication unit 120. The purpose importance specifying unit 110 corresponds to the purpose importance input means 12 illustrated in FIG. 1.

The unmanned vehicle 300 includes a purpose importance transmitting and receiving unit 301, a purpose importance holding unit 302, an action parameter calculating unit 303, an autonomous action controlling unit 304, and an unmanned vehicle communication unit 330. The unmanned vehicle communication unit 330 is a communication unit provided in the unmanned vehicle 300. The unmanned vehicle communication unit 330 is a module for transmitting and receiving data via the communication network 200. The purpose importance transmitting and receiving unit 301 receives, via the unmanned vehicle communication unit 330, purpose importance information transmitted from the directing terminal 100.

The purpose importance holding unit 302 stores purpose importance information received from the directing terminal 100 within the unmanned vehicle 300. The purpose importance holding unit 302 includes, for example, a desired storage medium, such as a volatile memory or a non-volatile memory, and stores purpose importance information into the storage medium. The action parameter calculating unit 303 calculates a parameter for an autonomous action based on the stored purpose importance information. The action parameter calculating unit 303 sets a parameter for an autonomous action into the autonomous action controlling unit 304. The autonomous action controlling unit 304 is a controlling unit for the unmanned vehicle to act autonomously by making a self-determination in accordance with a purpose. The autonomous action controlling unit 304 has a parameter for changing the behavior of an action. The autonomous action controlling unit 304 controls an autonomous action of the unmanned vehicle 300 in accordance with a parameter set by the action parameter calculating unit 303. The action parameter calculating unit 303 corresponds to the action parameter determining means 13 illustrated in FIG. 1. The autonomous action controlling unit 304 corresponds to the action controlling means 14 illustrated in FIG. 1.

Figure 3:
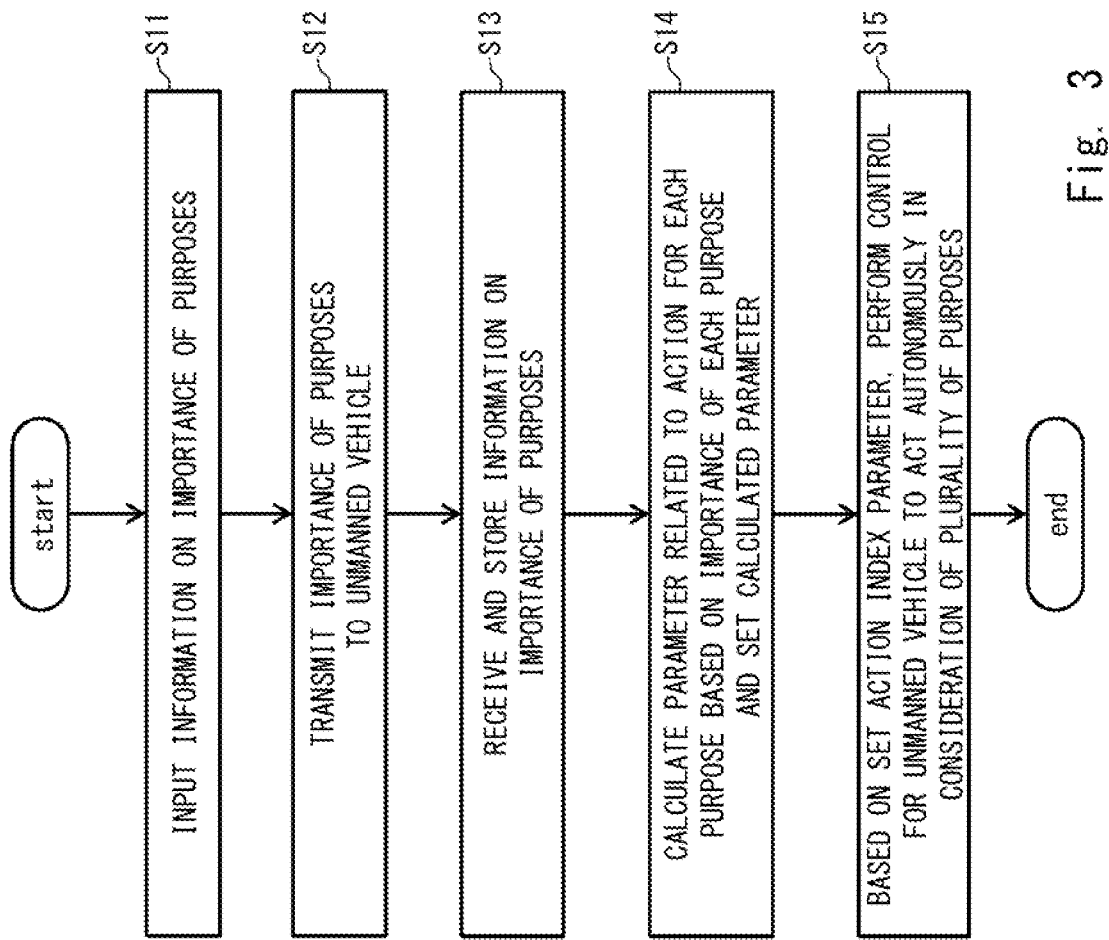
FIG. 3 is a flowchart illustrating a procedure of a process of specifying the importance of a purpose.

FIG. 3 illustrates a procedure of a process of specifying the importance of each purpose. A person inputs information on the importance of each purpose by using the purpose importance specifying unit 110 of the directing terminal 100 (step S11). The purpose importance specifying unit 110 transmits the information on the importance of the purposes to the unmanned vehicle 300 via the directing terminal communication unit 120 (step S12). The purpose importance transmitting and receiving unit 301 of the unmanned vehicle 300 receives the information on the importance of the purposes via the unmanned vehicle communication unit 330 (step S13). The purpose importance transmitting and receiving unit 301 stores the received purpose importance information into the purpose importance holding unit 302.

Based on the purpose importance information stored in the purpose importance holding unit 302, the action parameter calculating unit 303 calculates a parameter related to the action for each purpose and sets the calculated parameter into the autonomous action controlling unit 304 (step S14). Based on the set parameter, the autonomous action controlling unit 304 performs control such that the unmanned vehicle 300 acts autonomously in consideration of the plurality of purposes (step S15).

Next, a specific example will be described in which the importance of each purpose is specified and the specified importance of each purpose is then reflected on an autonomous action. In this example, the plurality of purposes considered are "purpose 1", "purpose 2", and "purpose 3". At step S22 of FIG. 13, a person specifies the importance of each purpose within a range of from 0 to 100, for example.

Figure 4:
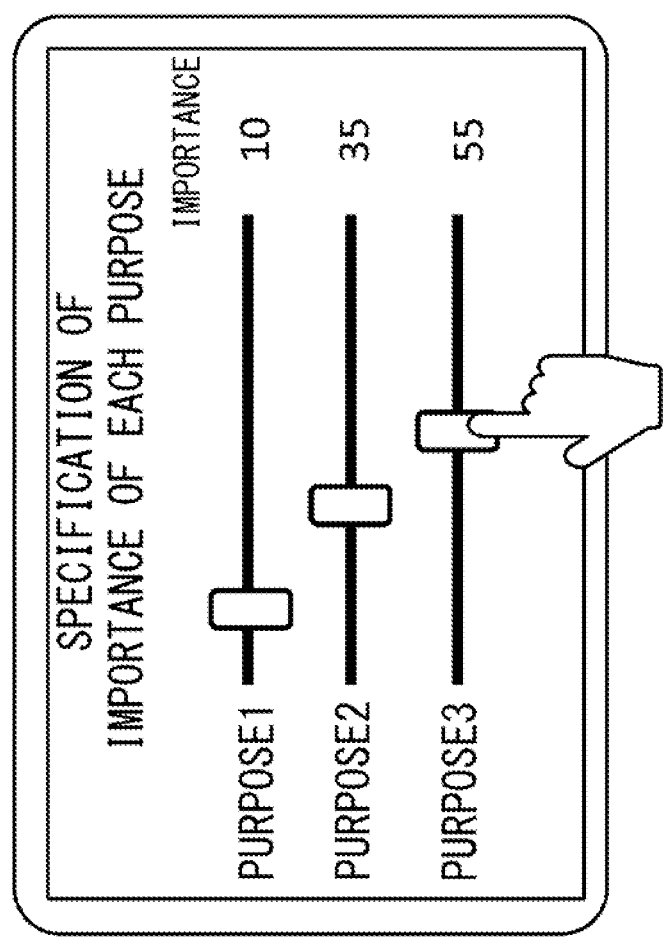
FIG. 4 illustrates an example of a screen display for specifying the importance of each purpose.

FIG. 4 illustrates an example of a screen display for specifying the importance of each purpose. The purpose importance specifying unit 110 displays the screen illustrated in FIG. 4 on, for example, a touch panel display device (not illustrated). A person can specify the importance of each purpose by operating a slider. In the example illustrated in FIG. 4, "purpose 3" has the highest importance, "purpose 2" has the second highest importance, and "purpose 1" has the lowest importance. The importance of each purpose can be specified in any desired manner, and a person may directly input a numerical value indicating the importance of each purpose. Alternatively, a person may select the purpose importance of each purpose from a set of preset parameters.

The purpose importance specifying unit 110 transmits the purpose importance information to the unmanned vehicle 300 via wireless communication, such as Wi-Fi (registered trademark) or Bluetooth (registered trademark), for example. The purpose importance transmitting and receiving unit 301 of the unmanned vehicle 300 stores the received purpose importance information into the purpose importance holding unit 302. The action parameter calculating unit 303 refers to the purpose importance holding unit 302 and calculates the parameter related to the autonomous action for each purpose based on the stored purpose importance information.

The action parameter calculating unit 303, for example, enables only the process for the purpose with the highest importance and disables the autonomous action process or processes for the other purposes. Specifically, in the example illustrated in FIG. 4, "purpose 3" has the highest importance of 55. In this case, the action parameter calculating unit 303 enables the process for "purpose 3" in the autonomous action controlling unit 304 and disables the processes for the remaining "purpose 1" and "purpose 2".

In another example, in a case where a motion vector for taking an action for each purpose is calculated within the autonomous action controlling unit 304, the action parameter calculating unit 303 may calculate a weight parameter with respect to the motion vector for each purpose based on the numerical value of the importance of each purpose. In this case, the autonomous action controlling unit 304 may obtain a weighted sum total of the motion vectors of the purposes.

In a specific example, a motion vector for taking an action for "purpose 1" is denoted by v1, a motion vector for taking an action for "purpose 2" is denoted by v2, and a motion vector for taking an action for "purpose 3" is denoted by v3. Based on the importance of each purpose, the action parameter calculating unit 303 determines a weight w1 of the motion vector v1, a weight w2 of the motion vector v2, and a weight w3 of the motion vector v3. The action parameter calculating unit 303, for example, sets the value of the weight higher as the importance is higher. For example, in a case where the importance of each purpose is specified as illustrated in FIG. 4, the importance of "purpose 1" is 10, and the weight w1 is determined to be 10/100=0.1. The importance of "2" is 35, and the weight w2 is determined to be 35/100=0.35. The importance of "purpose 3" is 55, and the weight w3 is determined to be 55/100=0.55. The autonomous action controlling unit 304 calculates the final motion vector through $v=w1 \times v1+w2 \times v2+w3 \times v3$. With this configuration, the motion vector for a purpose with a higher importance can have a greater impact on the final vector.

According to the present example embodiment, a person specifies the importance of each purpose of an autonomous action of the unmanned vehicle 300 by using the directing terminal 100. According to the present example embodiment, a person can specify the importance of each purpose by using, for example, the screen illustrated in FIG. 4. In the unmanned vehicle 300, the action parameter calculating unit 303 determines a parameter related to the action for each purpose based on the purpose importance information received from the directing terminal 100. According to the present example embodiment, a person only needs to input the importance of each purpose. The unmanned vehicle 300 converts the importance of each purpose to a parameter related to an autonomous action to be taken to serve each purpose in the unmanned vehicle 300 and sets the converted parameter. This configuration makes it possible to reflect the importance of each purpose specified by a person onto the unmanned vehicle simply. Accordingly, the present example embodiment can make the unmanned vehicle 300 change its action flexibly in response to a change in the situation.

Figure 5:
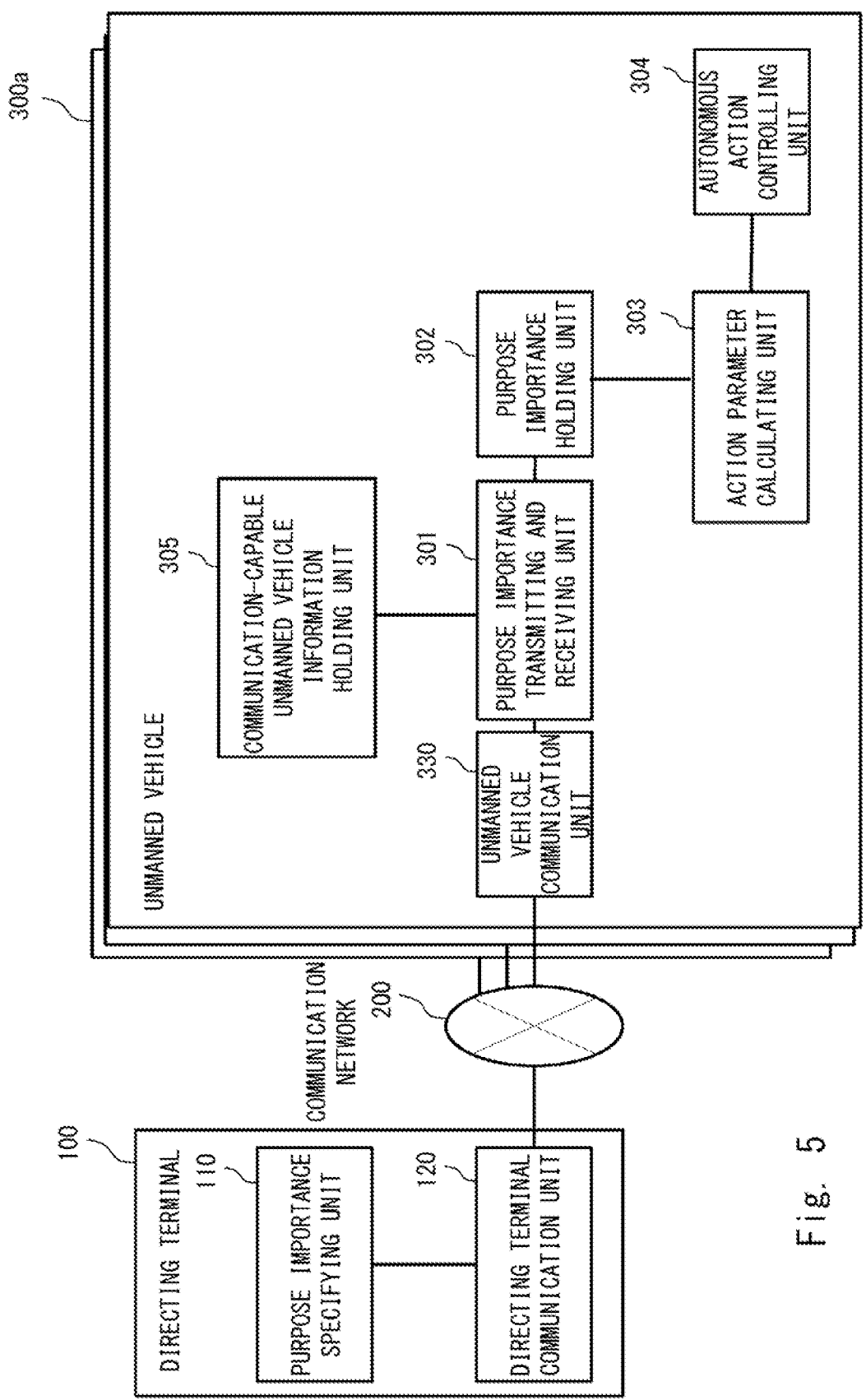
FIG. 5 is a block diagram illustrating an unmanned vehicle controlling system according to a second example embodiment of the present disclosure.

Next, a second example embodiment of the present disclosure will be described. FIG. 5 illustrates an unmanned vehicle controlling system according to the second example embodiment of the present disclosure. According to the present example embodiment, the unmanned vehicle controlling system includes a directing terminal 100 and a plurality of unmanned vehicles 300a. According to the present example embodiment, a communication network 200 is used also as a communication path for the plurality of unmanned vehicles 300a to exchange information among one another. There is no particular limitation on the number of the unmanned vehicles 300a according to the present example embodiment.

Each unmanned vehicle 300a includes a communication-capable unmanned vehicle information holding unit 305 in addition to the constituent elements of the unmanned vehicle 300 described according to the first example embodiment illustrated in FIG. 2. The communication-capable unmanned vehicle information holding unit 305 holds information for accessing another unmanned vehicle 300 that is currently capable of communication. According to the present example embodiment, the purpose importance transmitting and receiving unit 301 functions also as a purpose importance transmitting means that transmits purpose importance information to another unmanned vehicle 300a. The configuration of the directing terminal 100 may be similar to the configuration of the directing terminal described according to the first example embodiment illustrated in FIG. 2. The present example embodiment is for spreading purpose importance information to the plurality of unmanned vehicles 300a via ad hoc communication.

Figure 6:
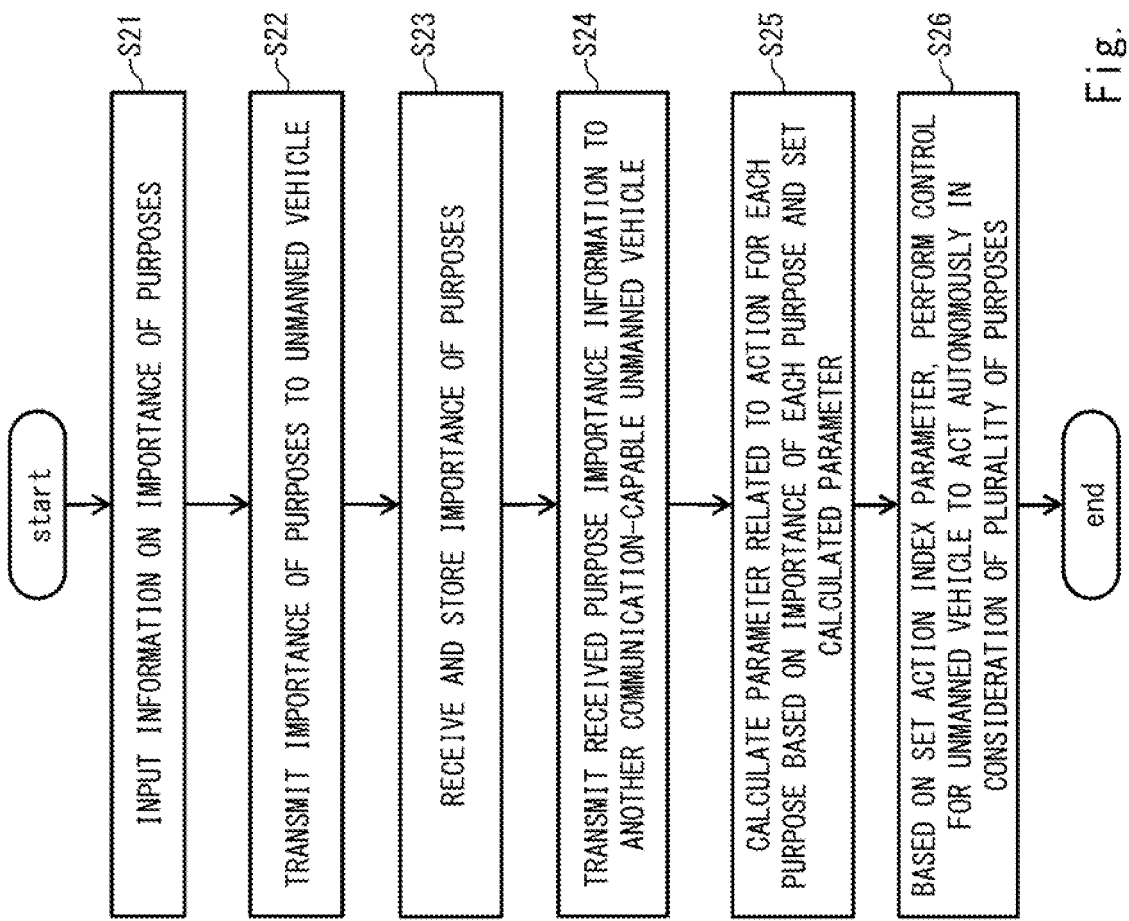
FIG. 6 is a flowchart illustrating a procedure of an operation of an unmanned vehicle controlling system.

Next, an operation procedure will be described. FIG. 6 illustrate a procedure of an operation of the unmanned vehicle controlling system. A person inputs information on the importance of each purpose (step S21). The purpose importance specifying unit 110 transmits the information on the importance of the purposes to one unmanned vehicle 300a via the directing terminal communication unit 120 (step S22). The purpose importance transmitting and receiving unit 301 of the unmanned vehicle 300a receives the information on the importance of the purposes via the unmanned vehicle communication unit 330 (step S23). The purpose importance transmitting and receiving unit 301 stores the received purpose importance information into the purpose importance holding unit 302. Steps S21 to S23 may be similar to steps S11 to S13 of FIG. 3.

The purpose importance transmitting and receiving unit 301 transmits the purpose importance information to another unmanned vehicle 300a stored in the communication-capable unmanned vehicle information holding unit 305 (step S24). According to the present example embodiment, one or more of the plurality of unmanned vehicles 300a receive purpose importance information from the directing terminal 100, and the remaining one or more unmanned vehicles 300a receive purpose importance information from another unmanned vehicle 300a. Based on the purpose importance information stored in the purpose importance holding unit 302, the action parameter calculating unit 303 calculates a parameter related to the action for each purpose and sets the calculated parameter into the autonomous action controlling unit 304 (step S25). Based on the set parameter, the autonomous action controlling unit 304 performs control such that the unmanned vehicle 300a acts autonomously in consideration of the plurality of purposes (step S26). Steps S25 and S26 may be similar to steps S14 and S15 of FIG. 3.

According to the present example embodiment, an unmanned vehicle 300a transmits purpose importance information to another unmanned vehicle 300a. Since the purpose importance information can be transmitted and received between the plurality of unmanned vehicles 300a according to the present example embodiment, the directing terminal 100 does not need to transmit the purpose importance information to all the unmanned vehicles 300a. Therefore, even in a case where the unmanned vehicle controlling system includes a large number of unmanned vehicles 300a, for example, the importance of each purpose intended by a person can be reflected on the large number of unmanned vehicles 300a simply. Other advantageous effects are similar to those according to the first example embodiment.

Figure 7:
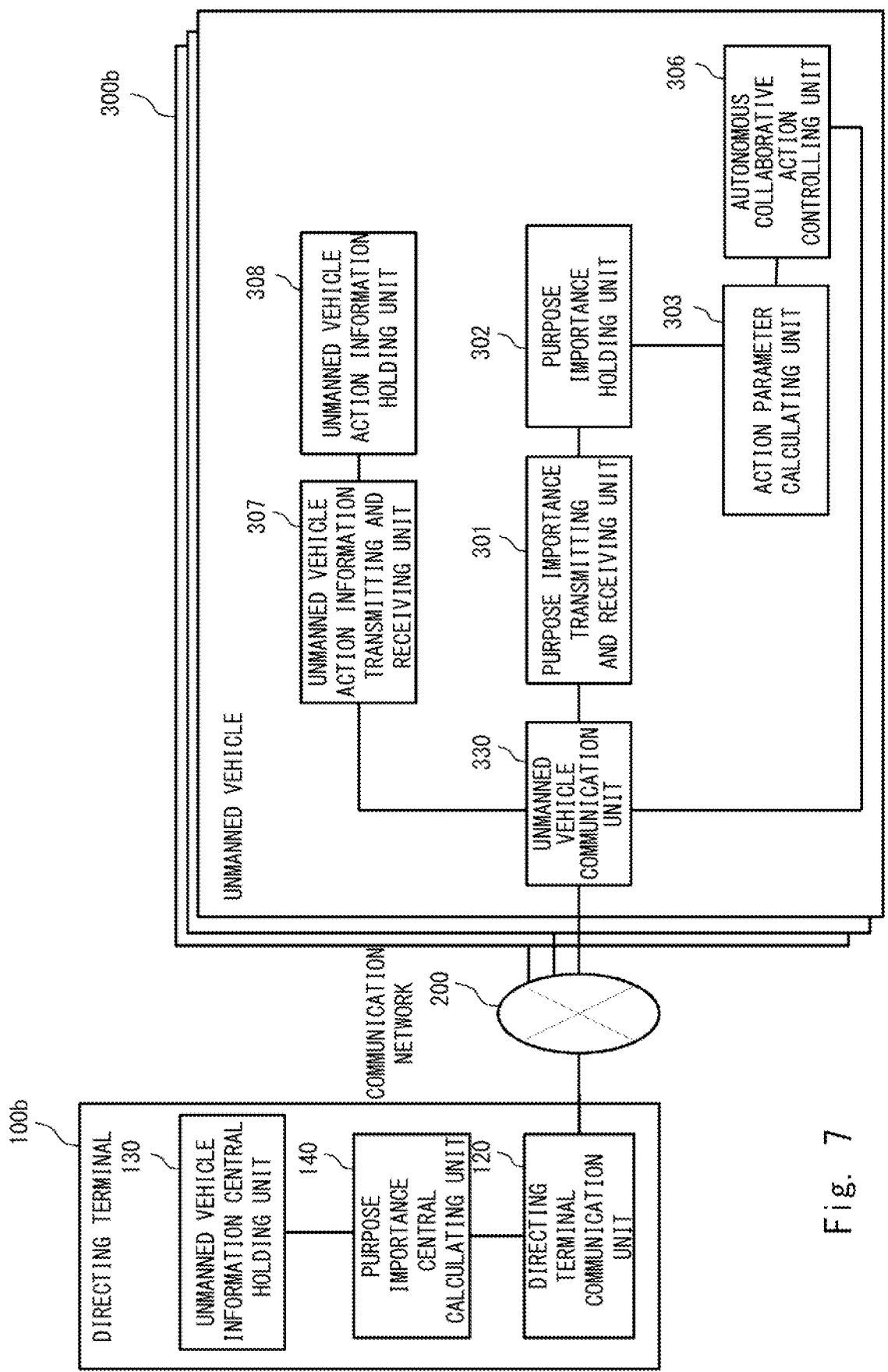
FIG. 7 is a block diagram illustrating an unmanned vehicle controlling system according to a third example embodiment of the present disclosure.

Next, a third example embodiment of the present disclosure will be described. FIG. 7 illustrates an unmanned vehicle controlling system according to the third example embodiment of the present disclosure. According to the present example embodiment, the unmanned vehicle controlling system includes a directing terminal 100b and a plurality of unmanned vehicles 300b. The directing terminal 100b can communicate with the plurality of unmanned vehicles 300b via a communication network 200. Each unmanned vehicle 300b can communicate with the directing terminal 100b and with other unmanned vehicles 300b via the communication network 200. There is no particular limitation on the number of the unmanned vehicles 300b according to the present example embodiment. The present example embodiment is for calculating the importance of purposes centrally based on action information of each unmanned vehicle 300b and spreading the calculated importance.

The directing terminal 100b includes a directing terminal communication unit 120, an unmanned vehicle information central holding unit 130, and a purpose importance central calculating unit 140. The unmanned vehicle information central holding unit 130 stores action information transmitted from each unmanned vehicle 300b for each unmanned vehicle 300b. The purpose importance central calculating unit 140 calculates the importance of each purpose by use of, for example, action information or external information of a group of unmanned vehicles 300b. The directing terminal communication unit 120 may be similar to the directing terminal communication unit 120 described according to the first example embodiment illustrated in FIG. 2. According to the present example embodiment, the purpose importance central calculating unit 140 corresponds to the purpose importance input means 12 illustrated in FIG. 1.

Each unmanned vehicle 300b includes a purpose importance transmitting and receiving unit 301, a purpose importance holding unit 302, an action parameter calculating unit 303, an autonomous collaborative action controlling unit 306, an unmanned vehicle action information transmitting and receiving unit 307, an unmanned vehicle action information holding unit 308, and an unmanned vehicle communication unit 330. The purpose importance transmitting and receiving unit 301, the purpose importance holding unit 302, and the action parameter calculating unit 303 may be similar to those of the unmanned vehicle 300 described according to the first example embodiment illustrated in FIG. 2.

The unmanned vehicle action information transmitting and receiving unit (action information transmitting means) 307 of an unmanned vehicle transmits information concerning the action of itself to the directing terminal 100. The unmanned vehicle action information holding unit 308 of an unmanned vehicle stores information concerning the action of itself. The autonomous collaborative action controlling unit 306 performs control so that a plurality of unmanned vehicles can autonomously act collaboratively according to a purpose. According to the present example embodiment, the autonomous collaborative action controlling unit 306 corresponds to the action controlling means 14 illustrated in FIG. 1.

Figure 8:
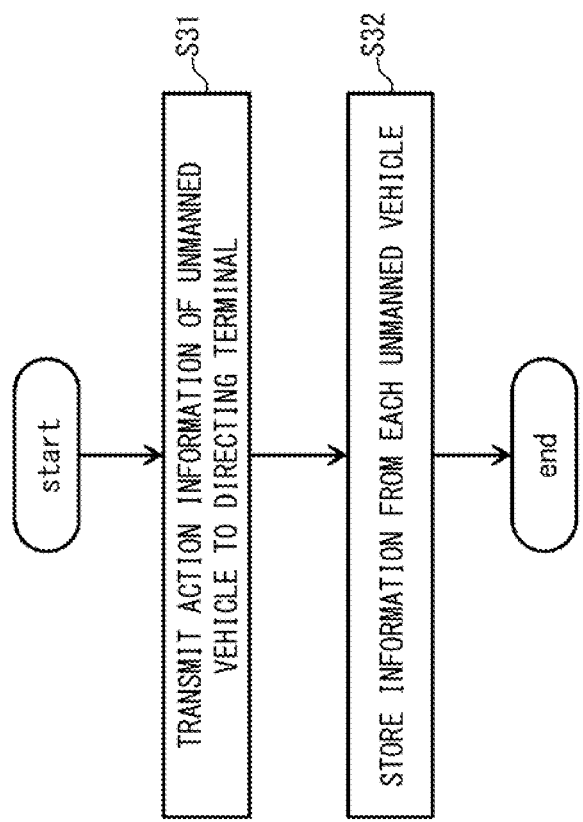
FIG. 8 is a flowchart illustrating a procedure of an operation performed to transmit action information.

Next, an operation procedure according to the present example embodiment will be described. FIG. 8 illustrates a procedure of an operation performed to transmit action information. Each unmanned vehicle 300b transmits information concerning the action of itself stored in the unmanned vehicle action information holding unit 308 to the directing terminal 100b via the unmanned vehicle action information transmitting and receiving unit 307 (step S31). The directing terminal 100b receives the action information via the directing terminal communication unit 120. The directing terminal 100b stores the received action information into the unmanned vehicle information central holding unit 130 (step S32).

Figure 9:
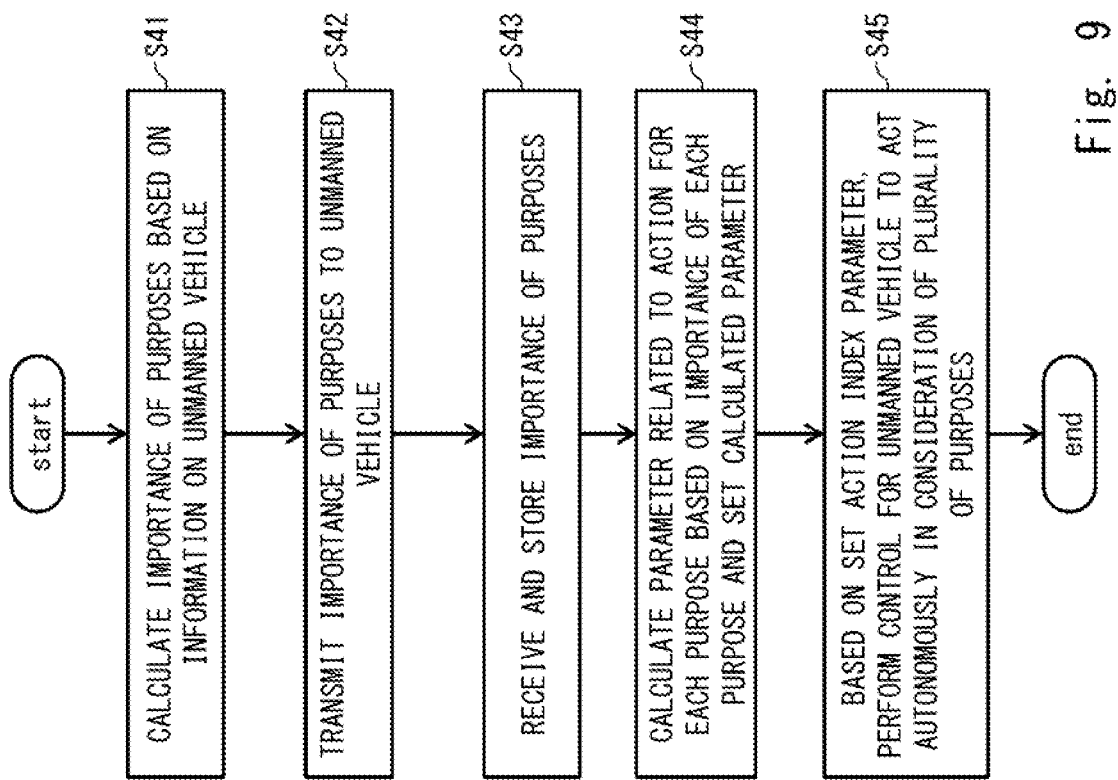
FIG. 9 is a flowchart illustrating a procedure of an operation performed to calculate and transmit the importance of a purpose.

FIG. 9 illustrates a procedure of an operation performed when the directing terminal 100b calculates the importance of a purpose and transmits the calculated importance to an unmanned vehicle 300b. The purpose importance central calculating unit 140 calculates the importance of a purpose by use of, for example, action information or external information of each unmanned vehicle 300b stored in the unmanned vehicle information central holding unit 130 (step S41). The directing terminal communication unit 120 transmits information on the importance of the purpose calculated at step S41 to each unmanned vehicle 300b (step S42).

The purpose importance transmitting and receiving unit 301 of each unmanned vehicle 300b receives the information on the importance of the purposes via the unmanned vehicle communication unit 330 (step S43). The purpose importance transmitting and receiving unit 301 stores the received purpose importance information into the purpose importance holding unit 302. Based on the purpose importance information stored in the purpose importance holding unit 302, the action parameter calculating unit 303 calculates a parameter related to the action for each purpose and sets the calculated parameter into the autonomous collaborative action controlling unit 306 (step S44). Based on the set parameter, the autonomous collaborative action controlling unit 306 performs control such that each unmanned vehicle 300b autonomously acts collaboratively in consideration of the plurality of purposes (step S45).

Next, a specific example of calculating the importance of purposes based on action information of an unmanned vehicle 300b will be described. In the example described below, the purpose importance central calculating unit 140 determines the importance in accordance with a policy and based on the time-series degrees of contribution of the purposes of each unmanned vehicle 300b. An assumption in the following description is that "purpose 1", "purpose 2", and "purpose 3" are set in each unmanned vehicle 300b. Of the three purposes, "purpose 1" is the most important to be executed. An example of "purpose 1" may be to track a suspicious person or a suspicious object, and this action is of high importance but does not arise frequently.

The purpose importance central calculating unit 140 inquires whether any one of the unmanned vehicles 300b has taken an action for "purpose 1". If any one of the unmanned vehicles 300b has taken even a slight action for "purpose 1", the purpose importance central calculating unit 140 tentatively raises the setting of the importance of "purpose 1" and causes each unmanned vehicle 300b to take the action for "purpose 1" intensively.

For example, it is assumed that the number of the unmanned vehicles 300b is three, and the degrees of contribution of the three purposes are recorded at regular intervals in each unmanned vehicle 300b. In a normal operation, it is assumed that the importance (weight) w1 of "purpose 1" is 0.5, the importance w2 of "purpose 2" is 0.3, and the importance w3 of "purpose 3" is 0.2. Each unmanned vehicle 300b transmits time-series data of the degree of contribution of each purpose to the directing terminal 100b.

The unmanned vehicle information central holding unit 130 of the directing terminal 100b stores the time-series data of the degree of contribution of each purpose received from each unmanned vehicle 300b. For example, when i is the identifier of a given unmanned vehicle, j is the identifier of a given purpose, and t is the identifier of the measured time; the unmanned vehicle information central holding unit 130 stores the degree of contribution $c\_ij$ of the purpose j of the unmanned vehicle i as $c\_ij=[c\_ij\_t, c\_ij\_t-1, c\_ij\_t-2]$. In this example, the unmanned vehicle information central holding unit 130 stores the degrees of contribution from the past three instances.

The purpose importance central calculating unit 140 determines the importance of each purpose based on the degree of contribution $c\_ij$ of each purpose in each unmanned vehicle stored in the unmanned vehicle information central holding unit 130. The purpose importance central calculating unit 140 determines, for example, whether the degree of contribution of "purpose 1" is no lower than a threshold in each unmanned vehicle 300b. If the degree of contribution of "purpose 1" is no lower than the threshold in any one of the unmanned vehicles 300, the purpose importance central calculating unit 140 determines the importance of each purpose to be in a "purpose 1 intensive state". In this "purpose 1 intensive state", the purpose importance central calculating unit 140, for example, sets the importance w1 of "purpose 1" to 0.7, sets the importance w2 of "purpose 2" to 0.2, and sets the importance w3 of "purpose 3" to 0.1.

The purpose importance central calculating unit 140 sends purpose importance information including the importance of each purpose determined as described above to each unmanned vehicle 300b. The purpose importance central calculating unit 140 makes each unmanned vehicle 300b operate in "purpose 1 intensive state" for a certain duration. Thereafter, the purpose importance central calculating unit 140 refers to the degree of contribution of each purpose received from each unmanned vehicle 300b and determines whether there is an unmanned vehicle 300b in which the degree of contribution of "purpose 1" is no lower than the threshold. If the degree of contribution of "purpose 1" is lower than the threshold in all of the unmanned vehicles 300b, the purpose importance central calculating unit 140 restores the importance of the purposes to its normal state. In other words, the purpose importance central calculating unit 140 sets the importance w1 of "purpose 1" to 0.5, sets the importance w2 of "purpose 2" to 0.3, and sets the importance w3 of "purpose 3" to 0.2.

According to the present example embodiment, the purpose importance central calculating unit 140 calculates the importance of each purpose based on action information acquired from each unmanned vehicle 300b. The purpose importance central calculating unit 140 transmits purpose importance information to each unmanned vehicle 300b, and this purpose importance information is reflected on the parameter of the autonomous action in each unmanned vehicle 300b. This configuration allows an autonomous action to be taken automatically so as to serve a purpose corresponding to a situation. Other advantageous effects are similar to those according to the first example embodiment.

Figure 10:
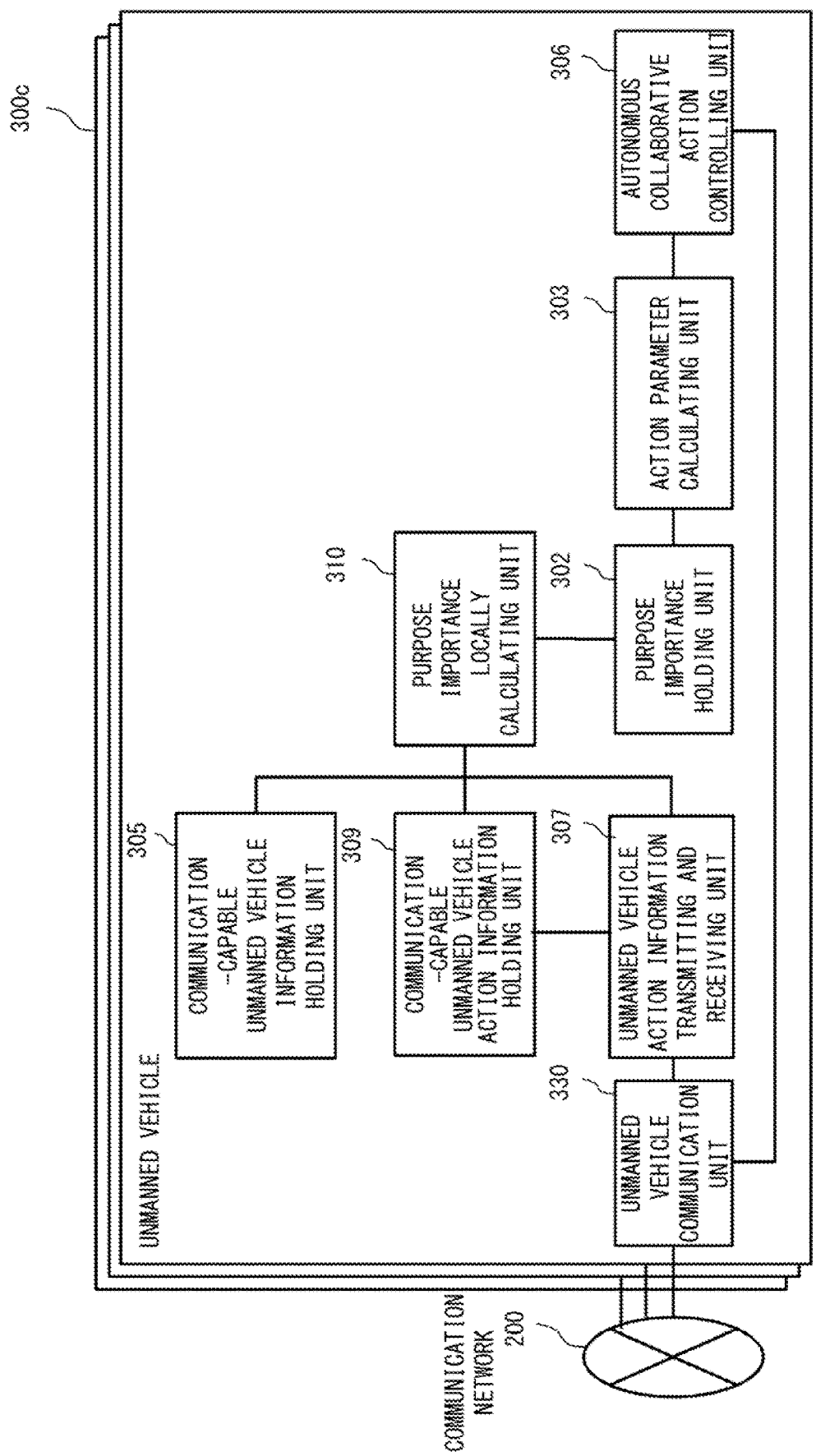
FIG. 10 is a block diagram illustrating an unmanned vehicle controlling system according to a fourth example embodiment of the present disclosure.

A fourth example embodiment of the present disclosure will be described. FIG. 10 illustrates an unmanned vehicle controlling system according to the fourth example embodiment of the present disclosure. According to the present example embodiment, the unmanned vehicle controlling system includes a plurality of unmanned vehicles 300c. The plurality of unmanned vehicles 300c can each communicate with the other unmanned vehicles 300c via a communication network 200. There is no particular limitation on the number of the unmanned vehicles 300c according to the present example embodiment. The present example embodiment is for each unmanned vehicle 300c to decentrally and locally calculate the importance of each purpose based on action information of each unmanned vehicle 300c.

Each unmanned vehicle 300c includes a purpose importance holding unit 302, an action parameter calculating unit 303, a communication-capable unmanned vehicle information holding unit 305, an autonomous collaborative action controlling unit 306, an unmanned vehicle action information transmitting and receiving unit 307, a communication-capable unmanned vehicle action information holding unit 309, a purpose importance locally calculating unit 310, and an unmanned vehicle communication unit 330. The purpose importance holding unit 302, the action parameter calculating unit 303, the communication-capable unmanned vehicle information holding unit 305, the autonomous collaborative action controlling unit 306, the unmanned vehicle action information transmitting and receiving unit 307, and the unmanned vehicle communication unit 330 may be similar to those described according to the first to third example embodiments.

The communication-capable unmanned vehicle action information holding unit 309 of an unmanned vehicle stores information on the action of itself and the action of one or more other communication-capable unmanned vehicles 300c. According to the present example embodiment, the unmanned vehicle action information transmitting and receiving unit (action information transmitting and receiving means) 307 transmits and receives action information to and from another communication-capable unmanned vehicle 300c. The purpose importance locally calculating unit 310 of an unmanned vehicle calculates the importance of each purpose based on the action information of itself and one or more other communication-capable unmanned vehicles 300c and stores the calculated importance into the purpose importance holding unit 302. According to the present example embodiment, the purpose importance locally calculating unit 310 corresponds to the purpose importance input means 12 illustrated in FIG. 1.

Figure 11:
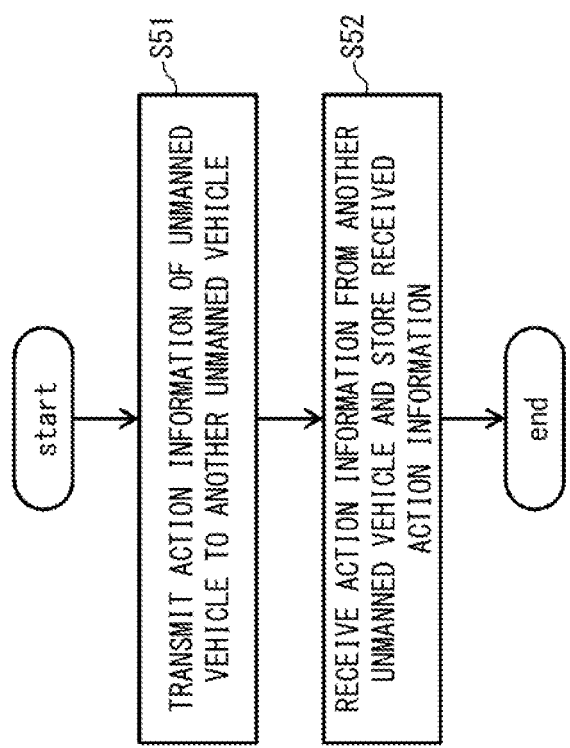
FIG. 11 is a flowchart illustrating a procedure of an operation performed to transmit and receive action information.

Next, an operation procedure according to the present example embodiment will be described. FIG. 11 illustrates a procedure of an operation performed to transmit and receive action information. The unmanned vehicle action information transmitting and receiving unit 307 refers to the communication-capable unmanned vehicle information holding unit 305 and transmits action information stored in the communication-capable unmanned vehicle action information holding unit 309 to another communication-capable unmanned vehicle 300c (step S51). The unmanned vehicle action information transmitting and receiving unit 307 receives action information transmitted from another unmanned vehicle 300c and stores the received action information into the communication-capable unmanned vehicle action information holding unit 309 (step S52).

Figure 12:
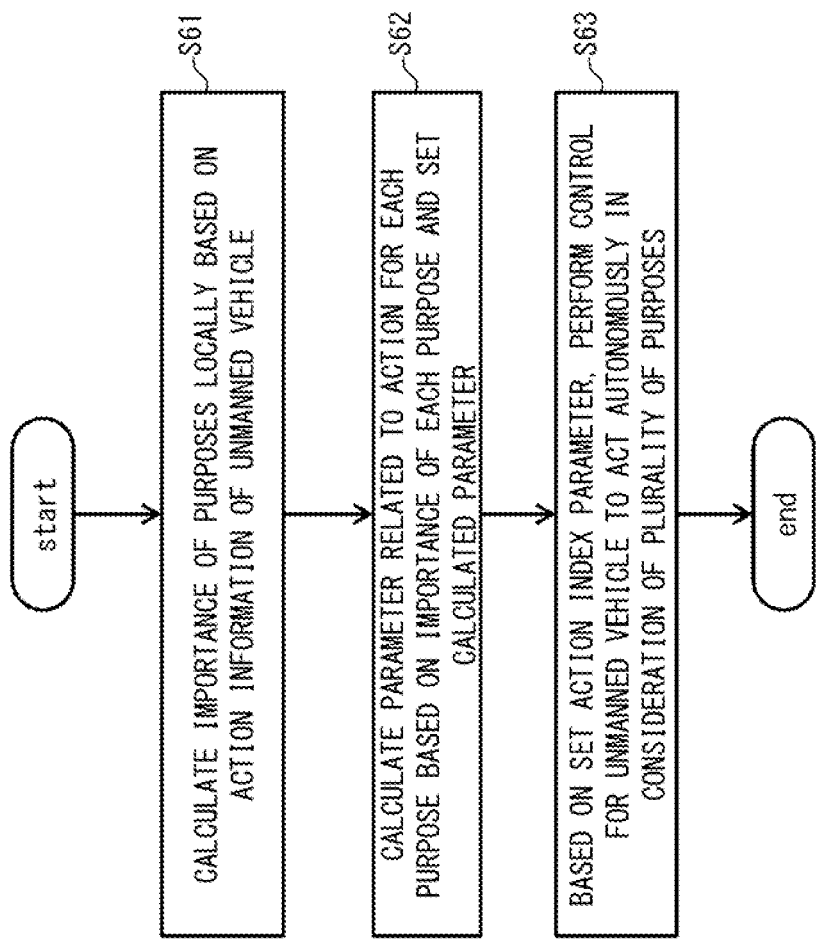
FIG. 12 is a flowchart illustrating a procedure of an operation performed when an unmanned vehicle calculates the importance of a purpose locally and reflects the calculated importance.

FIG. 12 illustrates a procedure of an operation performed when an unmanned vehicle 300c calculates the importance of each purpose locally and reflects the calculated importance. In each unmanned vehicle 300c, the purpose importance locally calculating unit 310 calculates the local importance of each purpose based on action information stored in the communication-capable unmanned vehicle action information holding unit 309 of each unmanned vehicle and stores the calculated local importance into the purpose importance holding unit 302 (step S61). The calculation of the importance of the purposes at step S61 may be similar to the calculation of the importance of the purposes at step S41 of FIG. 9.

Based on the purpose importance information stored in the purpose importance holding unit 302, the action parameter calculating unit 303 calculates a parameter related to the action for each purpose and sets the calculated parameter into the autonomous collaborative action controlling unit 306 (step S62). Based on the set parameter, the autonomous collaborative action controlling unit 306 performs control such that each unmanned vehicle 300b autonomously acts collaboratively in consideration of the plurality of purposes (step S63). Steps S62 and S63 may be similar to steps S44 and S45 of FIG. 9.

According to the present example embodiment, each unmanned vehicle 300c calculates the importance of each purpose on its own based on information concerning the local action of the unmanned vehicle 300c. Each unmanned vehicle 300c reflects the importance of each purpose calculated on its own to the parameter of its own autonomous action. This configuration allows each unmanned vehicle 300c to take an autonomous action so as to serve a purpose suitable for its own situation.

Figure 13:
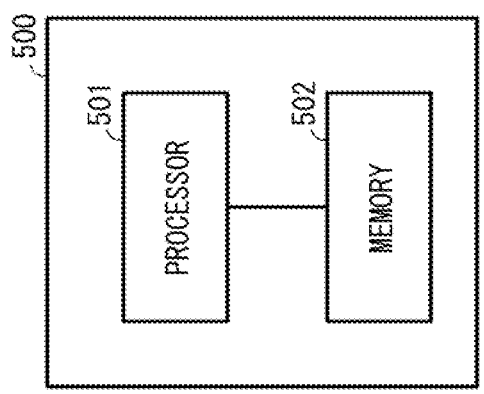
FIG. 13 is a block diagram illustrating an example of a configuration of a computer device.

According to the foregoing example embodiments, at least a part of the functions of the directing terminal 100 and the unmanned vehicle 300 can be implemented as a processor operates in accordance with a predetermined program read out from a memory, for example. FIG. 13 illustrates an example of a configuration of a computer device that can be used in the directing terminal 100 and the unmanned vehicle 300. A computer device 500 includes a processor 501 and a memory 502. The memory 502 includes a volatile memory and/or a non-volatile memory. The memory 502 stores software (computer program) to be executed by the processor 501 in a non-volatile memory, for example. The processor 501 reads out the computer program from the memory 502 and operates accordingly.

This program can be stored by use of various types of non-transitory computer-readable media and supplied to the computer device 500. The non-transitory computer-readable media include various types of tangible storage media. Examples of such non-transitory computer-readable media include a magnetic recording medium, such as a flexible disk, a magnetic tape, or a hard disk; a magneto-optical recording medium, such as a magneto-optical disk; an optical disc medium, such as a compact disc (CD) or a digital versatile disc (DVD); and a semiconductor memory, such as a mask read-only memory (ROM), a programmable ROM (PROM), an erasable PROM (EPROM), a flash ROM, or a random-access memory (RAM). The program may be supplied to the computer also by use of various types of transitory computer-readable media. Examples of such transitory computer-readable media include an electric signal, an optical signal, and an electromagnetic wave. The transitory computer-readable media can supply the program to the computer via a wired communication line, such as an electric wire or an optical fiber, or via a wireless communication line.

Thus far, some example embodiments of the present disclosure have been described in detail. The present disclosure, however, is not limited by the example embodiments described above, and an embodiment obtained by modifying or correcting the foregoing example embodiments within the scope that does not depart from the spirit of the present disclosure is also encompassed by the present disclosure.

For example, a part or the whole of the foregoing example embodiments can be described also as in, but not limited to, the following supplementary notes.

Supplementary Note 1

An unmanned vehicle controlling system, comprising:
an unmanned vehicle configured to act according to a plurality of purposes;
purpose importance input means configured to input importance of the purposes in the unmanned vehicle;
action parameter determining means configured to determine a parameter for controlling an action of the unmanned vehicle based on purpose importance information indicating the input importance of the purposes; and
action controlling means configured to control the action of the unmanned vehicle based on the parameter.

Supplementary Note 2

The unmanned vehicle controlling system according to Supplementary note 1, further comprising a directing terminal configured to be capable of communicating with the unmanned vehicle,
wherein the purpose importance input means is included in the directing terminal.

Supplementary Note 3

The unmanned vehicle controlling system according to Supplementary note 2, wherein the purpose importance input means is configured to input the importance of each of the purposes set by a person by use of the directing terminal.

Supplementary Note 4

The unmanned vehicle controlling system according to Supplementary note 2, wherein
the unmanned vehicle controlling system includes a plurality of unmanned vehicles,
the unmanned vehicle includes action information transmitting means configured to transmit unmanned vehicle action information to the directing terminal, and
the purpose importance input means is configured to determine the importance of the purposes based on unmanned vehicle action information received from the plurality of unmanned vehicles.

Supplementary Note 5

The unmanned vehicle controlling system according to Supplementary note 4, wherein the action controlling means is configured to perform control such that the plurality of unmanned vehicles autonomously act collaboratively according to the purposes.

Supplementary Note 6

The unmanned vehicle controlling system according to any one of Supplementary notes 1 to 5, wherein the unmanned vehicle controlling system includes a plurality of unmanned vehicles, at least some of the plurality of unmanned vehicles are configured to be capable of communicating with each other, and the unmanned vehicle includes purpose importance information transmitting means configured to transmit the purpose importance information to another communication-capable unmanned vehicle.

Supplementary Note 7

The unmanned vehicle controlling system according to Supplementary note 6, wherein
the unmanned vehicle further includes communication-capable unmanned vehicle information holding means configured to hold information on another communication-capable unmanned vehicle, and
the purpose importance information transmitting means is configured to transmit the purpose importance information to another unmanned vehicle by referring to the communication-capable unmanned vehicle information holding means.

Supplementary Note 8

The unmanned vehicle controlling system according to Supplementary note 1, wherein
the unmanned vehicle controlling system includes a plurality of unmanned vehicles,
at least some of the plurality of unmanned vehicles are configured to be capable of communicating with each other,
the purpose importance input means is included in each of the plurality of unmanned vehicles,
the unmanned vehicle includes action information transmitting and receiving means configured to transmit and receive unmanned vehicle action information to and from another communication-capable unmanned vehicle, and
the purpose importance input means is configured to determine the importance of the purposes based on unmanned vehicle action information of the unmanned vehicle and unmanned vehicle action information received from another unmanned vehicle.

Supplementary Note 9

The unmanned vehicle controlling system according to Supplementary note 8, wherein the action controlling means is configured to perform control such that the plurality of unmanned vehicles autonomously act collaboratively according to the purposes.

Supplementary Note 10

The unmanned vehicle controlling system according to Supplementary note 8 or 9, wherein
the unmanned vehicle further includes communication-capable unmanned vehicle information holding means configured to hold information on another communication-capable unmanned vehicle, and
the action information transmitting and receiving means is configured to transmit the unmanned vehicle action information to another unmanned vehicle by referring to the communication-capable unmanned vehicle information holding means.

Supplementary Note 11

An unmanned vehicle comprising:
action parameter determining means configured to determine a parameter for controlling an action of the unmanned vehicle based on purpose importance information indicating importance of a plurality of purposes in the unmanned vehicle that acts according to the plurality of purposes; and
action controlling means configured to control the action of the unmanned vehicle based on the parameter.

Supplementary Note 12

The unmanned vehicle according to Supplementary note 11, wherein the importance of the purposes is input from a directing terminal configured to be capable of communicating with the unmanned vehicle.

Supplementary Note 13

The unmanned vehicle according to Supplementary note 12, further comprising action information transmitting means configured to transmit unmanned vehicle action information to the directing terminal,
wherein the importance of the purposes is determined in the directing terminal based on unmanned vehicle action information received from the plurality of unmanned vehicles.

Supplementary Note 14

The unmanned vehicle according to any one of Supplementary notes 11 to 13, further comprising purpose importance information transmitting means configured to transmit the purpose importance information to another communication-capable unmanned vehicle.

Supplementary Note 15

The unmanned vehicle controlling system according to Supplementary note 11, further comprising:
action information transmitting and receiving means configured to transmit and receive unmanned vehicle action information to and from another communication-capable unmanned vehicle; and
purpose importance input means configured to determine the importance of the purposes based on unmanned vehicle action information of the unmanned vehicle and unmanned vehicle action information received from another unmanned vehicle.

Supplementary Note 16

A directing terminal comprising:
communication means configured to communicate with an unmanned vehicle that acts according to a plurality of purposes; and
purpose importance input means configured to input importance of the purposes in the unmanned vehicle.

Supplementary Note 17

The directing terminal according to Supplementary note 16, wherein the purpose importance input means is configured to input the importance of each of the purposes set by a person.

Supplementary Note 18

The directing terminal according to Supplementary note 17, wherein the purpose importance input means is configured to receive unmanned vehicle action information from a plurality of unmanned vehicles and determine the importance of the purposes based on the received unmanned vehicle action information.

Supplementary Note 19

An unmanned vehicle controlling method comprising:
determining a parameter for controlling an action of an unmanned vehicle based on purpose importance information indicating importance of a plurality of purposes in the unmanned vehicle that acts according to the plurality of purposes; and
controlling the action of the unmanned vehicle based on the parameter.

Supplementary Note 20

An unmanned vehicle controlling method comprising:
determining importance of a plurality of purposes in an unmanned vehicle that acts according to the plurality of purposes; and
transmitting the importance of the purposes to an unmanned vehicle configured to control an action thereof based on purpose importance information indicating the importance of the purposes.

Supplementary Note 21

A computer-readable medium storing a program that causes a processor to execute a process of:
determining a parameter for controlling an action of an unmanned vehicle based on purpose importance information indicating importance of a plurality of purposes in the unmanned vehicle that acts according to the plurality of purposes; and
controlling the action of the unmanned vehicle based on the parameter.

Supplementary Note 22

A computer-readable medium storing a program that causes a processor to execute a process of:
determining importance of a plurality of purposes in an unmanned vehicle that acts according to the plurality of purposes; and
transmitting the importance of the purposes to an unmanned vehicle configured to control an action thereof based on purpose importance information indicating the importance of the purposes.

INDUSTRIAL APPLICABILITY

The present disclosure can be applied to solutions and products where a human cooperates and collaborates with an unmanned vehicle or a group of unmanned vehicles.

REFERENCE SIGNS LIST

10: UNMANNED VEHICLE CONTROLLING SYSTEM
11: UNMANNED VEHICLE
12: PURPOSE IMPORTANCE INPUT MEANS
13: ACTION PARAMETER DETERMINING MEANS
14: ACTION CONTROLLING MEANS
100: DIRECTING TERMINAL
110: PURPOSE IMPORTANCE SPECIFYING UNIT
120: DIRECTING TERMINAL COMMUNICATION UNIT
130: UNMANNED VEHICLE INFORMATION CENTRAL HOLDING UNIT
140: PURPOSE IMPORTANCE CENTRALLY CALCULATING UNIT
200: COMMUNICATION NETWORK
300: UNMANNED VEHICLE
301: PURPOSE IMPORTANCE TRANSMITTING AND RECEIVING UNIT
302: PURPOSE IMPORTANCE HOLDING UNIT
303: ACTION PARAMETER CALCULATING UNIT
304: AUTONOMOUS ACTION CONTROLLING UNIT
305: COMMUNICATION-CAPABLE UNMANNED VEHICLE INFORMATION HOLDING UNIT
306: AUTONOMOUS COLLABORATIVE ACTION CONTROLLING UNIT
307: UNMANNED VEHICLE ACTION INFORMATION TRANSMITTING AND RECEIVING UNIT
308: UNMANNED VEHICLE ACTION INFORMATION HOLDING UNIT
309: COMMUNICATION-CAPABLE UNMANNED VEHICLE ACTION INFORMATION HOLDING UNIT
310: PURPOSE IMPORTANCE LOCALLY CALCULATING UNIT
330: UNMANNED VEHICLE COMMUNICATION UNIT

What is claimed is:

1. An unmanned vehicle controlling system comprising:
a plurality of unmanned vehicles that are each configured to act according to a plurality of purposes;
at least one memory storing instructions; and
at least one processor configured to execute the instructions to:
for each purpose, determine an importance of the purpose based on a degree of contribution to the purpose from each unmanned vehicle;
for each unmanned vehicle, determine a parameter for controlling an action of the unmanned vehicle based on importance of each purpose that has been determined; and
for each unmanned vehicle, control the action of the unmanned vehicle based on the parameter that has been determined.

2. The unmanned vehicle controlling system according to claim 1, further comprising a directing terminal comprising a second memory storing second instructions and a second processor configured to execute the second instructions, the directing terminal configured to communicate with each unmanned vehicle,
wherein the second processor of the directing terminal is configured to execute the second instructions to determine the importance of each purpose.

3. The unmanned vehicle controlling system according to claim 2, wherein
each unmanned vehicle comprises a third memory storing third instructions and a third processor configured to execute the third instructions,
the third processor of each unmanned vehicle is configured to execute the third instructions to transmit unmanned vehicle action information to the directing terminal, and the second processor of the directing terminal is configured to execute the second instructions to determine the importance of each purpose based on the unmanned vehicle action information received from each unmanned vehicle.

4. The unmanned vehicle controlling system according to claim 3, wherein the at least one processor is configured to control the action of each unmanned vehicle such that the plurality of unmanned vehicles autonomously act collaboratively according to the purposes.

5. The unmanned vehicle controlling system according to claim 1, wherein
each unmanned vehicle comprises a third memory storing instructions and a third processor configured to execute the third instructions,
the unmanned vehicles include particular unmanned vehicles that are configured to communicate with each other, and
the third processor of each particular unmanned vehicle is configured to execute the third instructions to transmit the importance of each purpose to another particular unmanned vehicle.

6. The unmanned vehicle controlling system according to claim 5, wherein
the third processor of each particular unmanned vehicle is configured to execute the third instructions to further:
store information on another third unmanned vehicle in a storage; and
configured to transmit the importance of each purpose to another particular unmanned vehicle by referring to the storage.

7. The unmanned vehicle controlling system according to claim 1, wherein
each a plurality of unmanned vehicle comprises a third memory storing third instructions and a third processor configured to execute the third instructions,
the unmanned vehicles include particular unmanned vehicles that are configured to communicate with each other,
the third processor of each particular unmanned vehicle is configured to execute the third instructions to:
transmit first unmanned vehicle action information to another particular unmanned vehicle;
receive second unmanned vehicle action information from another particular unmanned vehicle; and
determine the importance of each purpose based on the first unmanned vehicle action information and the second unmanned vehicle action information.

8. The unmanned vehicle controlling system according to claim 7, wherein the at least one processor is configured to execute the instructions control the action of each unmanned vehicle such that the plurality of unmanned vehicles autonomously act collaboratively according to the purposes.

9. The unmanned vehicle controlling system according to claim 7, wherein
the third processor of each particular unmanned vehicle is configured to execute the instructions to further:
store information on another particular unmanned vehicle in a storage; and
transmit the information to another particular unmanned vehicle by referring to the storage.

10. The unmanned vehicle controlling system according to claim 1, wherein, when the degree of contribution for a given purpose from any unmanned vehicle is larger than or equal to a threshold value, the importance of the given purpose is set to a value higher than a predetermined importance in each unmanned vehicle.

11. The unmanned vehicle controlling system according to claim 1, wherein, when the degree of contribution for a given purpose from any unmanned vehicle is larger than or equal to a threshold value, the importance of the given purpose is set higher than other purposes in each unmanned vehicle.

12. The unmanned vehicle controlling system according to claim 1, wherein, when the degree of contribution for a given purpose from any unmanned vehicle is larger than or equal to a threshold value, the importance of the given purpose is set to a predetermined importance in each unmanned vehicle.

13. An unmanned vehicle controlling method for controlling a plurality of unmanned vehicles that are each configured to act according to a plurality of purposes, the unmanned vehicle controlling method comprising:
for each purpose, determining, by a processor, an importance of the purpose based on a degree of contribution to the purpose from each unmanned vehicle;
for each unmanned vehicle, determining, by the processor, a parameter for controlling an action of the unmanned vehicle based on the importance of each purpose that has been determined; and
for each unmanned vehicle, controlling, by the processor, the action of the unmanned vehicle based on the parameter that has been determined.

14. A non-transitory computer-readable medium storing a program executable by a processor to perform a process for controlling a plurality of unmanned vehicles that are each configured to act according to a plurality of purposes, the process comprising:
for each purpose, determining an importance of the purpose based on a degree of contribution to the purpose from each unmanned vehicle;
for each unmanned vehicle, determining a parameter for controlling an action of the unmanned vehicle based on the importance of each purpose that has been determined; and
for each unmanned vehicle, controlling the action of the unmanned vehicle based on the parameter that has been determined.

* * * * *